US010735882B2

(12) United States Patent
Han et al.

(10) Patent No.: US 10,735,882 B2
(45) Date of Patent: Aug. 4, 2020

(54) METHOD OF AUDIO-ASSISTED FIELD OF VIEW PREDICTION FOR SPHERICAL VIDEO STREAMING

(71) Applicant: AT&T Intellectual Property I, L.P., Atlanta, GA (US)

(72) Inventors: Bo Han, Bridgewater, NJ (US); Manuel Briand, Santa Monica, CA (US); Vijay Gopalakrishnan, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 40 days.

(21) Appl. No.: 15/993,777

(22) Filed: May 31, 2018

(65) Prior Publication Data
US 2019/0373391 A1 Dec. 5, 2019

(51) Int. Cl.
*H04S 7/00* (2006.01)
*H04N 21/233* (2011.01)
*H04N 21/218* (2011.01)

(52) U.S. Cl.
CPC ....... *H04S 7/303* (2013.01); *H04N 21/21805* (2013.01); *H04N 21/233* (2013.01); *H04S 2400/11* (2013.01)

(58) Field of Classification Search
CPC ............ H04N 21/8106; H04N 21/816; H04N 21/4394; H04N 21/6587; H04N 21/21805;
(Continued)

(56) References Cited

U.S. PATENT DOCUMENTS 6,185,152 B1 2/2001 Shen et al.
6,330,486 B1 12/2001 Padula et al.
(Continued)

FOREIGN PATENT DOCUMENTS

GB 2482140 A 1/2012
JP 2003018561 A 1/2003
(Continued)

OTHER PUBLICATIONS

Google, Spatial Audio, available at https://developers.google.com/resonance-audio/develop/overview, last updated Nov. 22, 2017, 3 pages.
(Continued)

*Primary Examiner* — Duc Nguyen
*Assistant Examiner* — Alexander L Eljaiek
(74) *Attorney, Agent, or Firm* — Guntin & Gust, PLC; Mark Wilinski

(57) ABSTRACT

Aspects of the subject disclosure may include, for example, a method for spherical video streaming over a network by a processing system including a processor, the method including prefetching audio data for rendering the spherical video; determining whether there is a single source or a plurality of sources of audio in the audio data; responsive to a determination that there is only one dominant source of the audio in the audio data, prefetching video data in a field of view centered on spatial coordinates of the dominant source of audio; responsive to a determination that there is the plurality of sources of the audio in the audio data, sorting the plurality of sources of the audio according to an estimated sound source energy for each source in the plurality of sources, thereby creating a sorted list of the plurality of sources; and prefetching video data in plural fields of view centered on spatial coordinates of each audio source in the sorted list of the plurality of sources, wherein the prefetching
(Continued)

is performed in an order corresponding to the sorted list, and wherein the prefetching occurs within an available bandwidth of the network. Other embodiments are disclosed.

20 Claims, 9 Drawing Sheets

(58) Field of Classification Search
CPC ..... H04N 21/23412; H04N 21/234345; H04N 21/234363; H04N 5/23238; H04N 9/8205; H04N 9/802; H04N 9/8211; H04N 19/167; H04N 19/597; G06K 9/00711; G06K 9/00718; G06K 9/3233; H04R 1/406; H04R 2499/15; H04R 5/033; H04S 2420/11; H04S 2400/01; H04S 2400/11; H04S 7/30; H04S 7/302; H04S 7/303; G06F 3/00; G06F 3/011; G06F 3/04815; G06T 15/20; G06T 19/006
USPC .......................................................... 700/94
See application file for complete search history.

(56) References Cited

U.S. PATENT DOCUMENTS

| | | |
|---|---|---|
| 6,593,956 B1 | 7/2003 | Potts et al. |
| 6,788,333 B1 | 9/2004 | Uyttendaele et al. |
| 7,002,617 B1 | 2/2006 | Smith et al. |
| 7,559,026 B2 | 7/2009 | Girish et al. |
| 9,137,434 B2 | 9/2015 | Hu et al. |
| 9,570,113 B2 | 2/2017 | Campbell et al. |
| 9,638,800 B1 | 5/2017 | Skowronek et al. |
| 9,723,223 B1 | 8/2017 | Banta et al. |
| 9,826,211 B2 | 11/2017 | Sawa et al. |
| 2003/0160862 A1 | 8/2003 | Charlier et al. |
| 2003/0220971 A1 | 11/2003 | Kressin et al. |
| 2015/0146078 A1 | 5/2015 | Aarrestad et al. |
| 2015/0189455 A1 | 7/2015 | Donaldson |
| 2016/0088222 A1 | 3/2016 | Jenny et al. |
| 2017/0026577 A1 | 1/2017 | You |
| 2017/0289219 A1 | 10/2017 | Khalid et al. |
| 2017/0318407 A1 | 11/2017 | Meister et al. |
| 2019/0005986 A1* | 1/2019 | Peters .................. H04S 7/303 |

FOREIGN PATENT DOCUMENTS

| | | |
|---|---|---|
| JP | 2011071686 A | 4/2011 |
| WO | 0060857 A1 | 10/2000 |
| WO | 2008139018 A1 | 11/2008 |

OTHER PUBLICATIONS

"Recommendation ITU-R BS.2076-1", Audio Definition Model, Jun. 2017, 106 pages.
Dmochowski, et al., "A Generalized Steered Response Power Method for Computationally Viable Source Localization", IEEE Transactions on Audio, Speech, and Language Processing ( vol. 15, Issue: 8, Nov. 2007)., 17 pages.
Do, et al., "A real-time SRP-PHAT source location implementation using stochastic region contraction (SRC) on a largeaperture microphone array", 2007, 4 pages.
Evers, et al., "Multiple source localisation in the spherical harmonic domain", 2014, 5 pages.
Fugal, et al., "Spatial audio—bringing realistic sound to 360 video", available at https://code.facebook.com/posts/412047759146896/spatial-audio-bringing-realistic-sound-to-360-video/, Feb. 22, 2017, 9 pages.
Han, et al., U.S. Appl. No. 15/901,609, filed Feb. 21, 2018, entitled "System and Method of Predicting Field of View for Immersive Video Streaming,", 64 pages.
Jarrett, et al., "3D Source Localization in the Spherical Harmonic Domain Using a Pseudointensity Vector", in the Proc. of 2010 18th European Signal Processing Conference, Aug. 2010, 5 pages.
Moore, et al., "Direction of arrival estimation using pseudo-intensity vectors with direct-path dominance test", 2013, 5 pages.
Pavlidi, et al., "3D localization of multiple sound sources with intensity vector estimates in single source zones", 2015, 5 pages.
Woodcock, et al., "Presenting the S3A object-based audio drama dataset", 2016, 8 pages.
Zotkin, et al., "Accelerated speech source localization via a hierarchical search of steered response power", 2004, 10 pages.

* cited by examiner

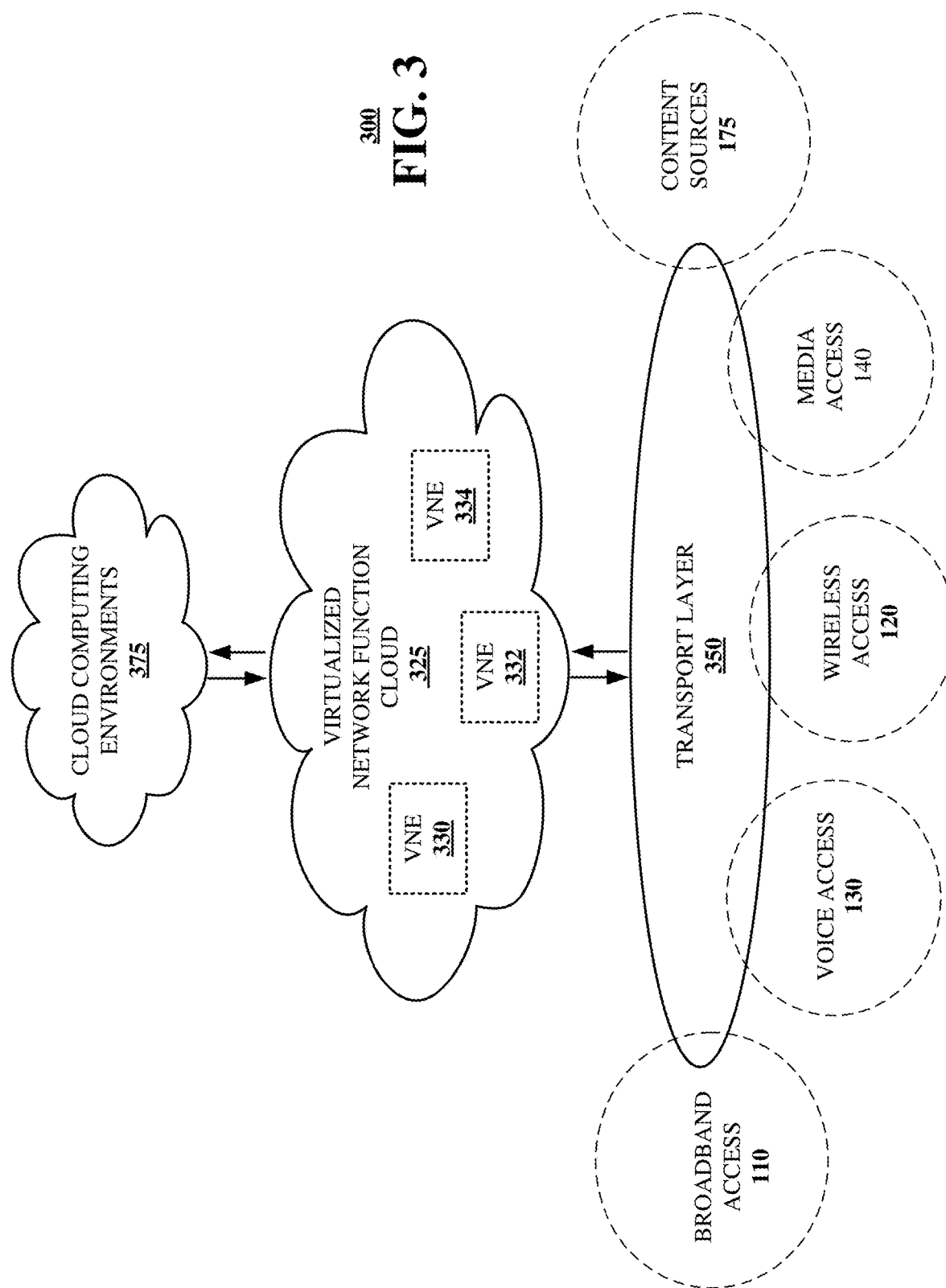

METHOD OF AUDIO-ASSISTED FIELD OF VIEW PREDICTION FOR SPHERICAL VIDEO STREAMING

FIELD OF THE DISCLOSURE

The subject disclosure relates to a method of audio-assisted field of view prediction for spherical video streaming.

BACKGROUND

Spherical videos, also known as immersive or 360-degree videos, provide users with a panoramic view that allows the viewer to freely control their viewing directions during video playback. Spherical videos are recorded by omnidirectional cameras or camera array systems (e.g., FACEBOOK® Surround 360). The camera array simultaneously records all 360 degrees of a scene that can be "wrapped" onto a 3D sphere, with the camera array at its center. Spherical videos provide users with panoramic views and create a unique viewing experience in particular when used in combination with the 3D video technology. When watching a spherical video, a viewer at the spherical center can freely control her viewing direction, so each playback creates a unique experience. Normally, a player displays only a visible portion of a spherical video, known as a field of view (FoV).

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein;

DETAILED DESCRIPTION

Figure 1:
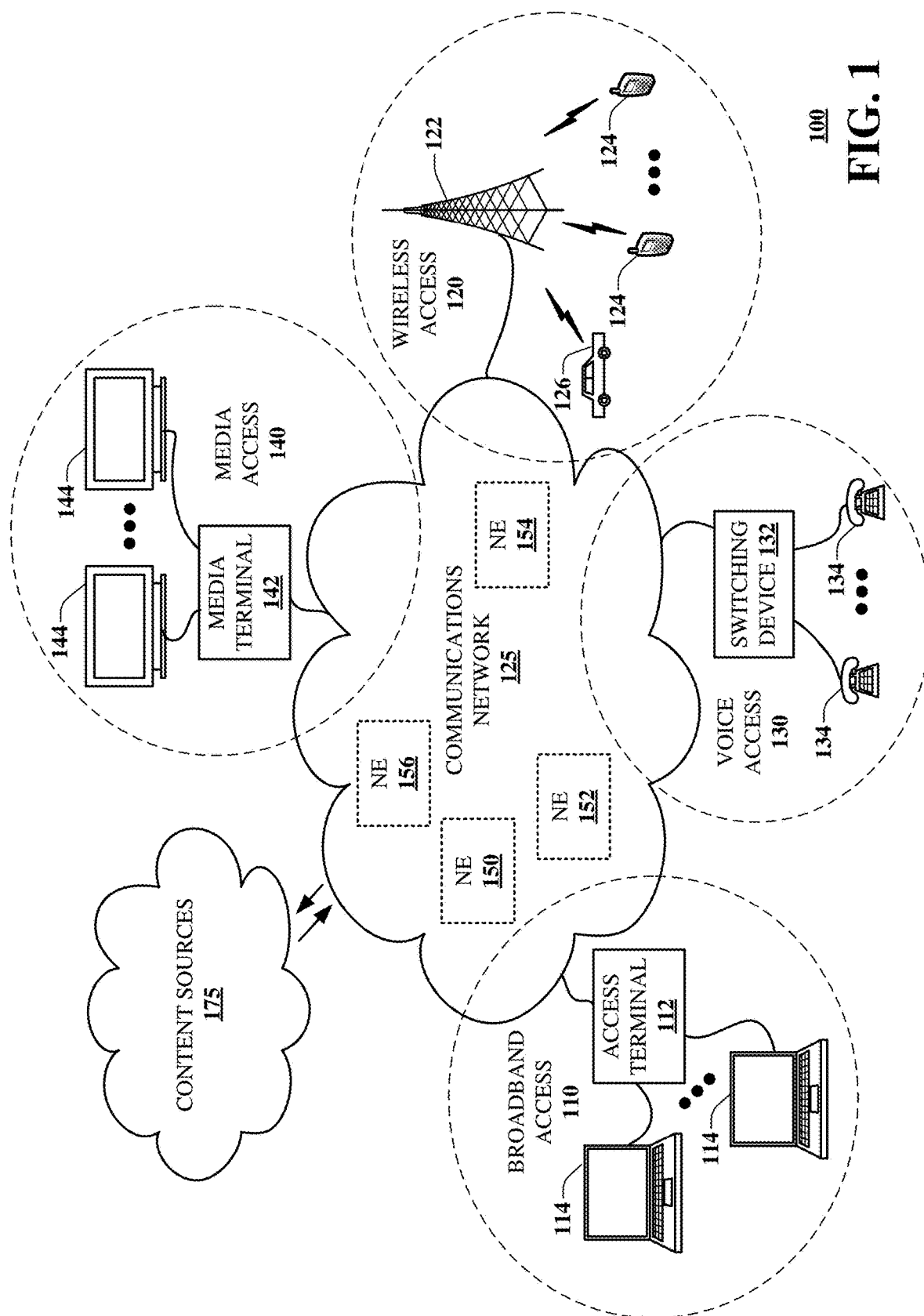
FIG. 1 is a block diagram illustrating an example, non-limiting embodiment of a communications network in accordance with various aspects described herein.

The subject disclosure describes, among other things, illustrative embodiments for predicting FoV for spherical video streaming using audio. Other embodiments are described in the subject disclosure.

One or more aspects of the subject disclosure include a method for spherical video streaming over a network by a processing system including a processor, the method including prefetching audio data for rendering the spherical video; determining whether there is a single source or a plurality of sources of audio in the audio data; responsive to a determination that there is only the single source of the audio in the audio data, prefetching video data in a field of view centered on spatial coordinates of the single source of audio; responsive to a determination that there is the plurality of sources of the audio in the audio data, sorting the plurality of sources of the audio according to an estimated sound source energy for each source in the plurality of sources, thereby creating a sorted list of the plurality of sources; and prefetching video data in plural fields of view centered on spatial coordinates of each audio source in the sorted list of the plurality of sources, wherein the prefetching is performed in an order corresponding to the sorted list, and wherein the prefetching occurs within an available bandwidth of the network.

One or more aspects of the subject disclosure include a device, comprising: a processing system including a processor; and a memory that stores executable instructions that, when executed by the processing system, facilitate performance of operations, the operations comprising: downloading audio data associated with a spherical video streaming on a network; identifying sources of audio in the audio data; determining whether there is a single source or a plurality of sources of the audio in the audio data; responsive to a determination that there is only the single source of the audio in the audio data, prefetching video data in a field of view centered on spatial coordinates of the single source of audio; responsive to a determination that there is the plurality of sources of the audio in the audio data, sorting the plurality of sources of the audio according to criteria for each source in the plurality of sources, thereby creating a sorted list of the plurality of sources; prefetching video data in plural fields of view centered on spatial coordinates of each audio source in the sorted list of the plurality of sources, wherein the prefetching is performed in an order corresponding to the sorted list, and wherein the prefetching of the video data is terminated after a certain number of fields of view; and rendering the audio data and the video data corresponding to a selected field of view, wherein the selected field of view is in the plural fields of view or the field of view centered on spatial coordinates of the single source of the audio.

One or more aspects of the subject disclosure include a non-transitory, machine-readable medium, comprising executable instructions that, when executed by a processing system including a processor, facilitate performance of operations, the operations comprising: prefetching audio data from a spherical video streaming over a network; identifying sources of audio in the audio data; determining whether there is a single source or a plurality of sources of the audio in the audio data; responsive to a determination that there is the plurality of sources of the audio in the audio data, sorting the plurality of sources of the audio according to criteria for each source in the plurality of sources, thereby creating a sorted list of the plurality of sources; prefetching video data in plural fields of view centered on spatial coordinates of each audio source in the sorted list of the plurality of sources, wherein the prefetching is performed in an order corresponding to the sorted list, and wherein the prefetching of the video data is terminated after a certain number of fields of view; and rendering the audio data and the video data corresponding to a selected field of view, wherein the selected field of view is in the plural fields of view.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
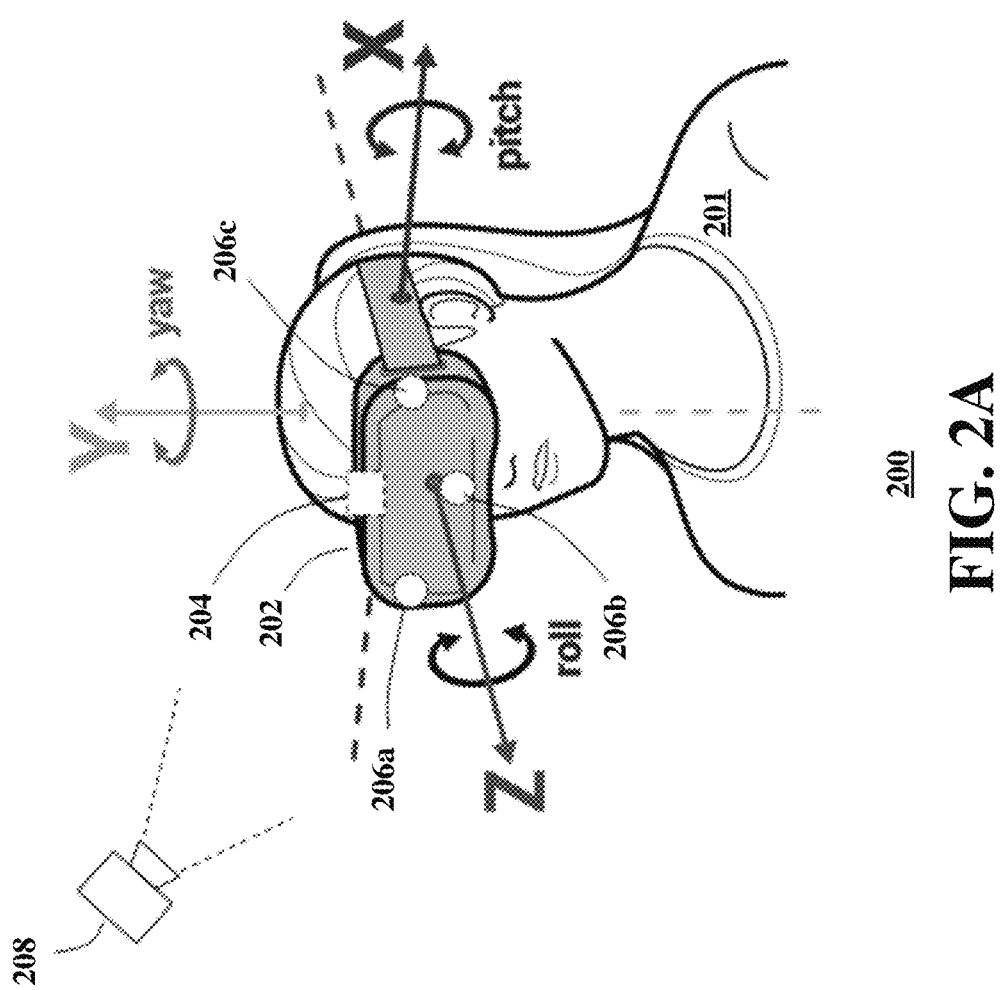
FIG. 2A depicts an illustrative embodiment of a spherical video viewing device.

FIG. 2A depicts an illustrative embodiment of a spherical video viewing device 200. As shown in FIG. 2, a user 201 wearing a VR headset 202 can adjust her orientation by changing the pitch, yaw, and/or roll of the VR headset 202, which correspond to rotating along one or more of the X, Y, and Z axes, respectively. Then a 360-degree video player, e.g., within the VR headset 202, computes and displays a viewing area, i.e., a display surface, based on the orientation and the field of view (FoV). The FoV can define an extent of the observable area, which is usually a fixed parameter of a VR headset (e.g., 110° horizontally and 90° vertically).

The example VR headset 202 can be equipped with a position and/or orientation sensor 204, such as position/orientation sensors available on smartphones, gaming goggles and/or tablet devices. Alternatively or in addition, the VR headset 202 includes one or more reference markers 206a, 206b and 206c (generally 206). The reference markers 206a, 206b, 206c are spaced apart in a predetermined configuration. An external sensor, such as a video camera 208, is positioned to observe the VR headset 202 during active use. The video camera 208 detects positions of the reference markers. Further processing, e.g., by an orientation detector can determine a position and/or orientation of the VR headset 202 based on the detected/observed positions of the reference markers 206.

As an important component of the virtual reality (VR) technology, spherical videos provide users 201 with panoramic views allowing them to freely control their viewing direction during video playback. Usually, a VR headset 202 displays only the visible portion of a spherical video. Thus, fetching the entire raw video frame wastes bandwidth. The techniques disclosed herein address the problem of optimizing spherical video delivery over wireless, e.g., cellular, networks. A measurement study was conducted on commercial spherical video platforms. A cellular-friendly streaming scheme is disclosed that delivers only a spherical video's visible portion based on head movement prediction. Viewing data collected from real users was used to demonstrate feasibility of an approach that can reduce bandwidth consumption by up to 80% based on a trace-driven simulation.

Conceptually, a novel cellular-friendly streaming scheme for spherical videos avoids downloading an entire spherical video, instead only fetching those parts, e.g., spatial segments or portions, of the spherical video that are visible to the user 201 in order to reduce bandwidth consumption associated with the video transfer. As display of any of the portion of the spherical video requires that the portion be fetched or otherwise downloaded, the disclosed approach benefits from a prediction of a viewer's head movement (to determine which portion of the spherical video view to fetch). Trace-driven analysis indicated that, at least in the short term, a viewers' head movement can be accurately predicted, e.g., with an accuracy >90%, by even using simple methods such as linear regression.

Spherical videos are very popular on major video platforms such as YOUTUBE® and FACEBOOK® platforms. Despite their popularity, the research community appears to lack an in-depth understanding of many of its critical aspects such as performance and resource consumption. To a large extent, spherical video inherits delivery schemes from traditional Internet videos. This simplifies the deployment, but makes spherical video streaming very cellular-unfriendly, because the video player always fetches the entire video including both visible and invisible portions. This leads to tremendous resource inefficiency on cellular networks with limited bandwidth, metered link, fluctuating throughput, and high device radio energy consumption. To address this issue, existing solutions have been focusing on either more advanced video encoding technologies to reduce the streaming bandwidth outside of FoVs or tile-based spherical video streaming.

Figure 2B:
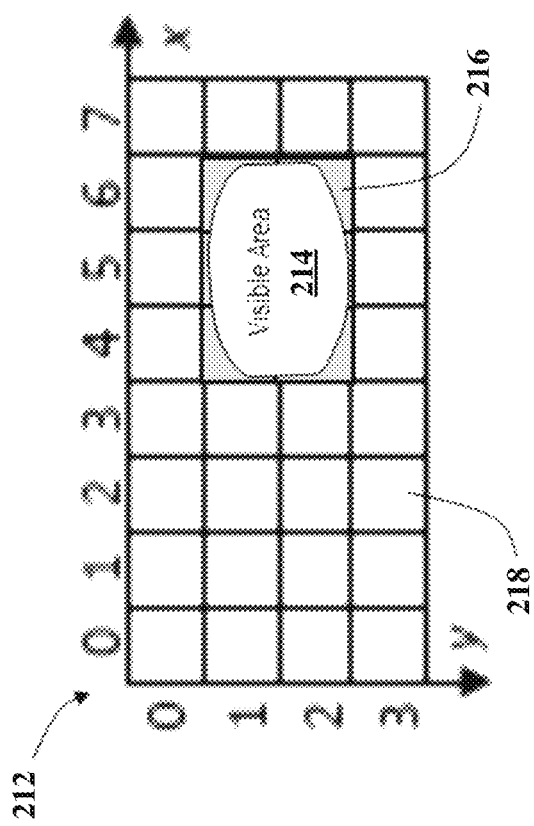
FIG. 2B depicts an illustrative embodiment spatial segmentation of a video chunk into tiles.

FIG. 2B depicts an illustrative embodiment of spatial segmentation of a video chunk for tile-based spherical video streaming. Each spherical video chunk is pre-segmented into multiple smaller chunks, which are called tiles. A tile has the same duration as a chunk while only covering a subarea of the chunk. The easiest way to generate the tiles is to evenly divide a chunk containing projected raw frames into m×n rectangles each corresponding to a tile. FIG. 2B illustrates an example pre-segmented chunk 212, where m=8 and n=4, resulting in 32 tiles 218 and where the visible area, θ is illustrated as a bounded display region 214. The client may only request the six tiles 216 ($4 \leq x \leq 6$; $1 \leq y \leq 2$) overlapping with the display region 214. Note that due to projection, despite the viewer's FoV being fixed, the size of the display region 214 and thus the number of requested tiles 216 may vary. For example, under equi-rectangular projection, more tiles are needed when the viewer looks downward compared to when she looks straight forward.

Besides the above approach, an alternative and more complex way is to apply segmentation directly on a projection surface, such as a 3D sphere of a spherical video, instead of on a projected 2D raw frame of pre-segmented chunk 212 so that each tile covers a fixed angle, e.g., a fixed solid angle. This makes the number of tiles to be requested irrespective of user's viewing direction (but their total bytes may still vary).

Performing the spatial segmentation of spherical video frames offline can reduce and/or otherwise eliminate server-side overhead. Multiple tiles can be requested in a single bundle to reduce network roundtrips. A tiles' metadata such as positions and/or addresses (e.g., web addresses or URLs) can be embedded in a metafile exchanged at the beginning of a video session.

If a viewer's head movement during a spherical video session is known beforehand, an optimal sequence of tiles can be generated that minimizes the bandwidth consumption. To approximate this in reality, a prediction of head movement is determined, e.g., according to a pitch, yaw, and roll and/or a change of pitch, yaw, and roll. To approximate this in reality, predicting the future FoV by leveraging multiple sources, such as head movement, video content analysis and user profile. See, e.g., U.S. patent application Ser. No. 15/901,609, filed Feb. 21, 2018, entitled "SYSTEM AND METHOD OF PREDICTING FIELD OF VIEW FOR IMMERSIVE VIDEO STREAMING," which is incorporated by reference herein. Note that the FoV prediction method is a key building block to enable the true spatial immersion by delivering 4K+ quality videos, which usually require at least 25 Mbps bitrate (recommended by Netflix). It is challenging to achieve this high bitrate over the current network infrastructure with limited bandwidth.

In at least some embodiments, the predictions and/or selective video fetch of portions of spherical video frames can be integrated with DASH and/or HTTP. Although currently most spherical videos use progressive download, it is envisioned they may switch to a Dynamic Adaptive Streaming over HTTP (DASH). Extensive research has been conducted on improving the quality of experience (QoE) of DASH video. A DASH video is split into chunks encoded with multiple discrete bitrate levels; a video player can switch between different bitrate levels at a chunk boundary. In contrast, spherical videos involve more complexity, because the player needs to make decisions at both the temporal and spatial dimension.

An important component of a DASH scheme is its rate adaptation algorithm, which determines the quality level of chunks to fetch. Improved techniques for spherical video streaming over cellular networks disclosed herein reduce bandwidth consumption, preferably with little or no detrimental effects to playback observed by a VR headset 202 (see FIG. 2A). Basically, instead of downloading entire spherical video raw frames, a video client predicts the future FoV of a viewer and then fetches only the tiles in the FoV in order to optimize the bandwidth consumption.

By leveraging head movement traces, for example, we use a sliding window of 1 second from T−1 to T to predict future head position (and thus the FoV) at T+δ for each dimension of yaw, pitch, and roll. Another key data source of FoV prediction is the video content itself which can be analyzed through either the statistic from crowdsourced viewing data or object-feature detection from the actual video frames. Popular spherical videos from commercial content providers and video-sharing websites attract a large number of viewers. Also, users' viewing behaviors are often affected by the video content. This is also true for spherical videos: at certain scenes, viewers are more likely to look at a certain spots or directions, and thus we can predict the FoV based on the crowdsourced viewing statistical information. By employing object-feature detection, the video can be analyzed. For example, when watching soccer and tennis videos, most likely viewers will follow the movement of the soccer, key players and tennis balls. Thus, if we can detect the soccer and tennis balls, key soccer players and referee, we may be able to achieve a high accuracy of FoV prediction.

Moreover, existing work has demonstrated that it is possible to model the video viewing behavior of users by leveraging stochastic models such as Markovian model. The model can be constructed using actions from a user when viewing a spherical video, including pause, stop, jump, forward and rewind. This type of user profile complements the head-movement based and video content analysis assisted FoV prediction. Even if a user does not change the view direction, the FoV may change dramatically if a forward/rewind action is issued by the viewer. The stochastic models of video viewing behavior can help improve the accuracy of FoV prediction. The future FoV prediction can also leverage the personal interest of a user. For example, if we know from the profile that a user does not like thrilling scenes, very likely he/she will skip this type of content when watching a spherical video. Thus, the probability of predicting a FoV from these scenes will be low.

However, there are several important limitations and challenges of the above approach. The dynamic human head movement when watching a spherical video makes the accurate prediction of future FoV extremely difficult and usually involves advanced machine learning technologies. Crowdsourced viewing-data collection requires a huge number of users to get statistical significance which needs to instrument a spherical video player and requires a wide adoption of the instrumented player. Analysis of video content is time consuming and computation intensive, and is a challenging issue itself. An embodiment predicts the future FoVs from a different angle, by prefetching and analyzing spatial audio content of spherical videos.

Figure 2C:
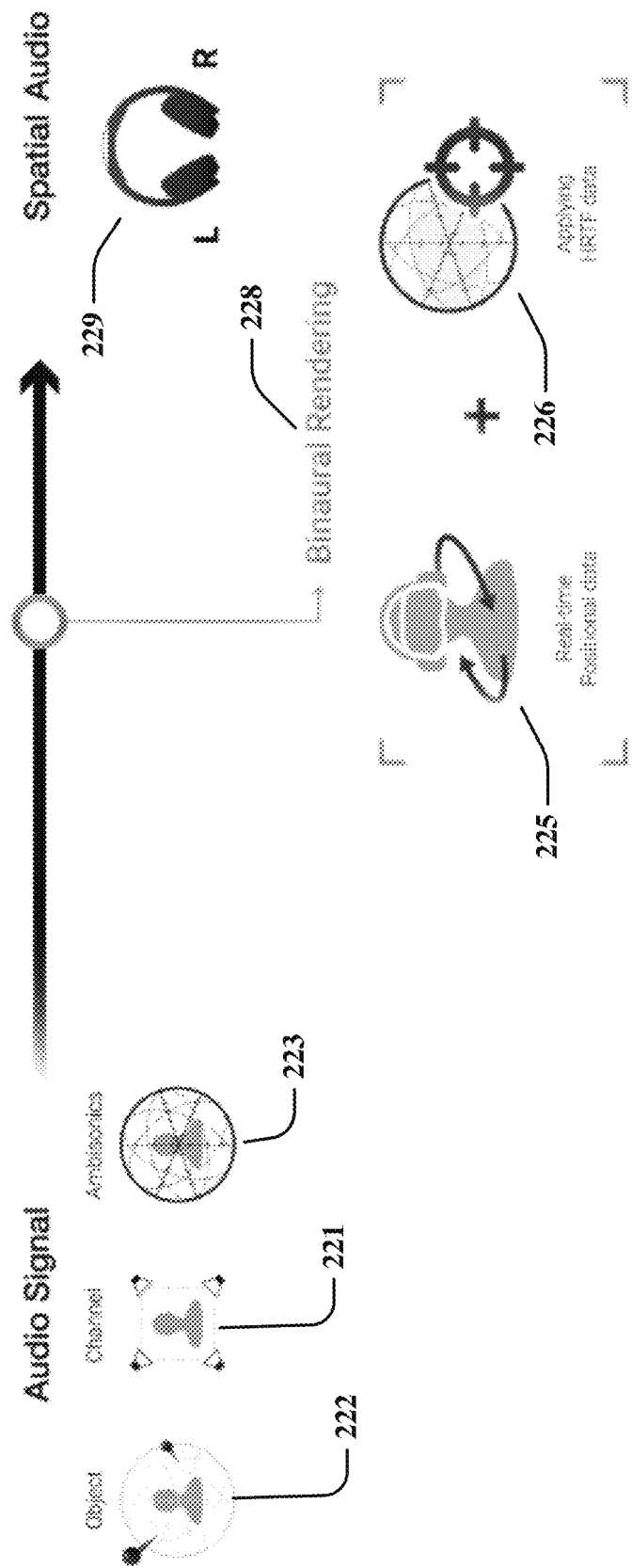
FIG. 2C an illustrative embodiment for a system that provides binaural rendering of spatialized audio from three paradigms of streamed audio signals.

FIG. 2C depicts an illustrative embodiment for a system that provides binaural rendering of spatialized audio from three paradigms of streamed audio signals. FIG. 2C illustrates the three paradigms of audio signals as a channel-based representation 221, an object-based representation 222 and a scene-based representation 223 (e.g., Ambisonics). For the channel-based representation 221, each channel is associated with a loudspeaker. Sound is reproduced by mixing these channels on multiple speakers. The channel-based representation 221 has been used for many decades. For example, stereo 2.0, 5.1 and 7.1 signal formats are each a channel-based representation 221. However, an issue with the channel-based representation 221 is that the speaker setup used to reproduce the sound may not match the signal format. The object-based representation 222 leverages a sound source from an object. An audio scene usually contains individual sound sources for each object with the positional information of their locations, directivity patterns and the rendering environment. The scene-based representation 223 is different from the other two representations, because the sound field is independent of the description of individual sound sources (either speakers or objects). Instead, the scene-based representation 223 represents the whole sound field at the user's position using spherical harmonics with various orders. A first-order sound field has four channels of audio signal; whereas a third-order field has 16 channels. Most spherical videos use an MP4 container with H.264 video and AAC (Advanced Audio Coding) audio carrying First Order Ambisonics (FOA), e.g., with 4 audio channels W, X, Y and Z.

In order to get the full immersive and believable VR experience, a viewer needs not only spherical video, but also spatial audio. Both GOOGLE® and FACEBOOK® are actively working on spatial audio formats to improve the quality of user experience for their spherical video streaming services. Traditional stereo audio places a sound in either the left ear or the right ear of a listener, but fails to create the perception of depth or height for the sound (e.g., in front of or behind the listener). Spherical audio makes the listener feel that the sound is coming from a certain direction. As a user looks around in the spherical video, an interactive and immersive experience is enabled with head-tracking movement information 225 and an application of head-related transfer functions (HRTFs) 226 to the audio signals for binaural rendering 228 spatial audio in a headset 229. By binaural rendering 228 spatial audio relative to the current FoV, the user audio-visual cues are fully synchronized.

As shown in FIG. 2C, binaural rendering 228 plays sounds from various directions using head-tracking movement information 225 and HRTFs 226. HRTFs 226 enable binaural rendering 228 of spatial audio over a headset 229. HRTFs 226 construct audio filters that are applied to an audio stream to fool a listener, so that the listener perceives sounds that come from a particular location of the 3D space, e.g., above, behind, left, right, etc. YOUTUBE® supports FOA with 4 channels. FACEBOOK® supports a higher-order Ambisonics system with 8 spatialized channels to represent actions happening anywhere within a spherical video scene and 2 head-locked audio channels for narration or background music, which does not respond to head-tracking movement information 225.

When watching a spherical video, users can move their heads and perceive the relative sound changes in all time levels and frequency cues. Spatial audio can be used to direct the attention of the listener to a particular location or FoV. As a result, future FoVs may heavily depend on spatial audio information. An advantage of audio-assisted FoV prediction is that the amount of audio data is usually much smaller than video data. Hence, it is feasible to prefetch audio data for analysis and FoV prediction, thereby saving bandwidth. In an embodiment, future FoVs are predicted by prefetching spatial audio data of a spherical video and then analyzing the audio data to localize interesting sound sources that may potentially draw the attention of the viewer, which leads to a change in the FoV.

Figure 2D:
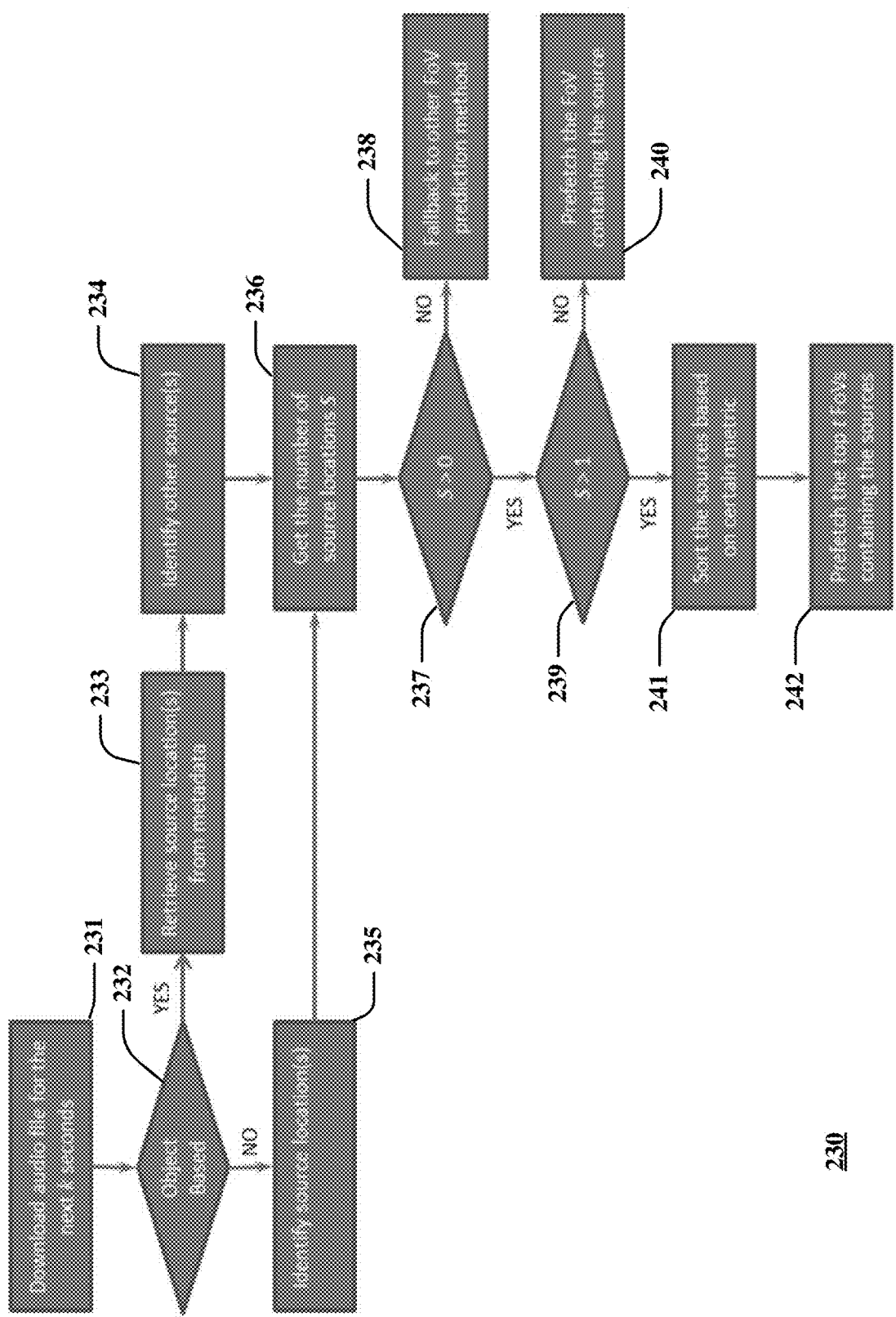
FIG. 2D depicts an illustrative embodiment of a method of predicting a FoV while streaming a spherical video over a network by leveraging spatial audio signal data.

FIG. 2D depicts an illustrative embodiment of a method of predicting a FoV while streaming a spherical video over a network by leveraging spatial audio signal data. In an embodiment, the method is performed by a system that identifies one or more sound sources, and assumes that the predicted FoV will be an area centered at the one or more sound sources.

The method begins at step 231, where audio data is prefetched in advance of the rendering of the spherical video. For example, a certain amount (k) of audio data is downloaded in advance of the present view of the spherical video. Given the small size of audio file payload, compared to video file payload, the value of k could be up to a few hundreds of seconds.

Next, in step 232, the system determines whether the audio data is an object-based representation. If not, then the method continues at step 235.

If the audio data is an object-based representation, then in step 233, the position of an audio object should be described in the metadata co-existing with the audio content data. For example, the International Telecommunication Union Radiocommunication sector (ITU-R) defines the Audio Definition Model (ADM) which uses distance, elevation and azimuth as the attributes to describe the positional information of an audio object. Specially, the audioChannelFormat attributes include several typeDefinitions, Matrix for channel-based representation audio, Objects for object-based representation audio, HOA for scene-based representation 223, etc. The 'Objects' type of channel has the sub-elements 'azimuth', 'elevation' and 'distance' to describe the location of the sound. The system can retrieve the source location(s) from the metadata, as defined in ITU-R BS.2076.

In step 234, other sources are identified by the system through analysis of the audio sound field, e.g., Ambisonics signals, to derive the coordinates of the most energetic sound sources at any given point in time and frequency domains. Two commonly used measures to define acoustic source location are sound pressure and particle velocity. Both techniques may use either a time- or frequency-based computation where the latter may provide more accurate results. A traditional method uses the time difference of arrival (TDOA) to estimate the source direction. Other indirect methods include Steered Response Power (SRP) and Intensity Vector. See Dmochowski et al., "A Generalized Steered Response Power Method for Computationally Viable Source Localization," IEEE Transactions on Audio, Speech, and Language Processing (vol. 15, issue: 8, November 2007) and Jarrett et al., "3D source Localization in the Spherical Harmonic Domain using a Pseudointensity Vector," Proc. of 18th European Signal Processing Conference (Aalborg, Denmark, Aug. 23-27, 2010), which are incorporated by reference herein. Instead of combining several estimations of TDOAs for acoustic source localization, SRP searches for a candidate on a grid of spatial points for the actual source location. SRP steers a beam toward every possible direction and determines which one has the highest power.

Intensity vector is defined as a function of the measured sound pressure and particle velocity. The intensity vector can be calculated based on the samples of the channels, and generate the intensity vector for every discrete wavenumber, which provides an estimated position for the sound source.

If the spatial audio metadata, e.g., object metadata, is not available then the method continues to step 235, where other sources and their locations are identified by the system largely following the same analysis as performed in step 234 described above.

Next, in step 236, a total number of source locations are identified. As is known in the art, the human auditory system is able to detect/perceive one audio event in each of 24 critical bands. The critical bands establish a frequency resolution of the human auditory system. Therefore, for all localization methods described herein, the system can estimate spatial coordinates for a maximum of 24 audio sources at any given point in time. In other words, depending on the complexity of the implementation of the method, the system should estimate spatial coordinates for 1 to 24 audio sources at any moment. In an embodiment, provided the computational complexity of the system can accommodate such estimation, a frequency-based estimation method can be used to determine dominant sound source coordinates for any given moment in the spherical video from the audio data.

In step 237, the system determines whether any sound source has been identified. If not, then the method continues at step 238, where the system falls back on other FoV prediction schemes, for example, those based on head-movement prediction or video-content analysis. For example, see U.S. patent application Ser. No. 15/901,609, filed Feb. 21, 2018, entitled "SYSTEM AND METHOD OF PREDICTING FIELD OF VIEW FOR IMMERSIVE VIDEO STREAMING," which is incorporated by reference herein.

Next, in step 239, the system determines whether there is more than one sound source. If not, then in step 240 the system prefetches a FoV that corresponds with the single source of the audio. In such case, the system prefetches only the FoV that centers at the spatial coordinates of the single source of the audio.

However, if there is more than one source, then the method continues with step 241, where the sources of the audio are sorted into a sorted list. In one embodiment, the sources of the audio are sorted according to estimated sound source energy and the previously estimated dominant sound source. In other words, if there are S sound sources, the S sound sources will be ordered according to their relative energy.

In another embodiment, audio sources having roughly the same amount of energy can be ordered based on their proximity to other sources. For example, two sources may have approximately the same amount of energy, but different spatial locations, both equidistant from the viewer's location. A third, dominant source may have a location nearer to a first of the two sources. The system may order the first of the two sources higher than a second of the two sources, since the first source is nearer to the dominant source. In another embodiment, audio sources having roughly the same amount of energy can be ordered based on their proximity to the viewer.

Finally, in step 242, the system will prefetch FoVs that include the identified sound sources. In an embodiment, the system will prefetch as many FoVs as possible, within the available bandwidth of the network over which the spherical video is being streamed, in the order that the FoVs are sorted. In another embodiment, the system will prefetch a maximum of 24 FoVs. In another embodiment, the system will prefetch the lesser of 24 FoVs or as many FoVs as possible, within the available bandwidth of the network over which the spherical video is being streamed. In another embodiment, the system will prefetch FoVs between the current FoV and the dominant source of the audio, i.e., the FoV corresponding to the top source of the audio in the sorted list. In yet another embodiment, the system will prefetch only a certain number (t) of FoVs corresponding to the top t sources of audio in the sorted list.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Furthermore, additional modifications may also be implemented. For example, in an embodiment, the FoV can be predicted by network elements that analyze audio data prior to streaming the spherical video based on the techniques described herein, and then network elements can optimize encoding of the spherical video before transmission. In another embodiment, network elements can convert spherical video content by analyzing the audio data from a channel-based representation 221 or a scene-based representation 223 on the fly, during the streaming process, and/or analyze scene-based representation 223 audio data, to enumerate object-based sources of audio that are provided during streaming to the user's rendering device, so that the rendering device can more easily determine sources of the audio and predict future FoVs.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of spherical video viewing device 200, and method 230 presented in FIGS. 1, 2C, 2D and 3. For example, the virtualized communication network can implement the binaural rendering system 220 illustrated in FIG. 2C, or the processing system that performs the method 230 illustrated in FIG. 2D.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements in a distributed processing environment. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
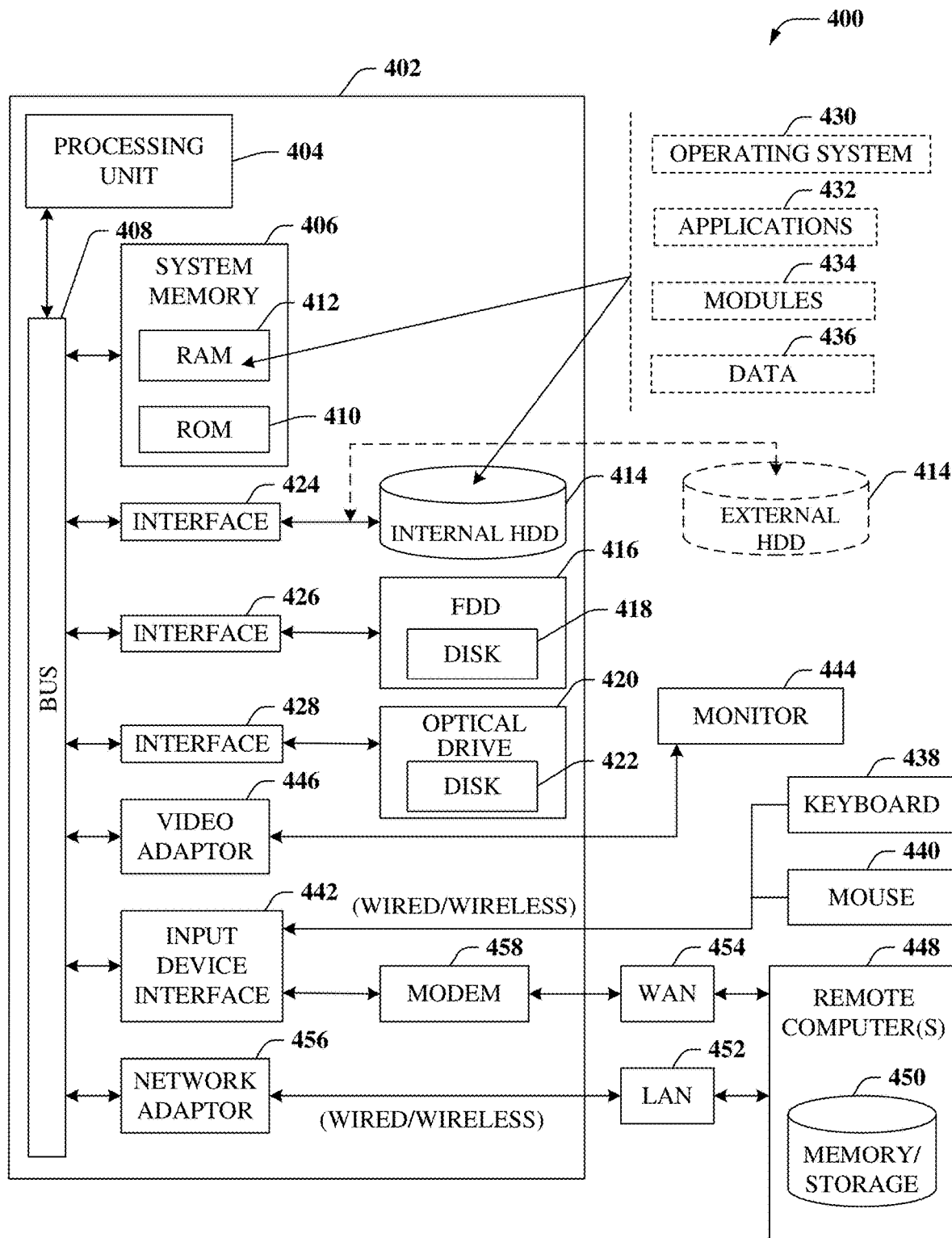
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, the binaural rendering system 220, a processing system that performs the method 230, and/or VNEs 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
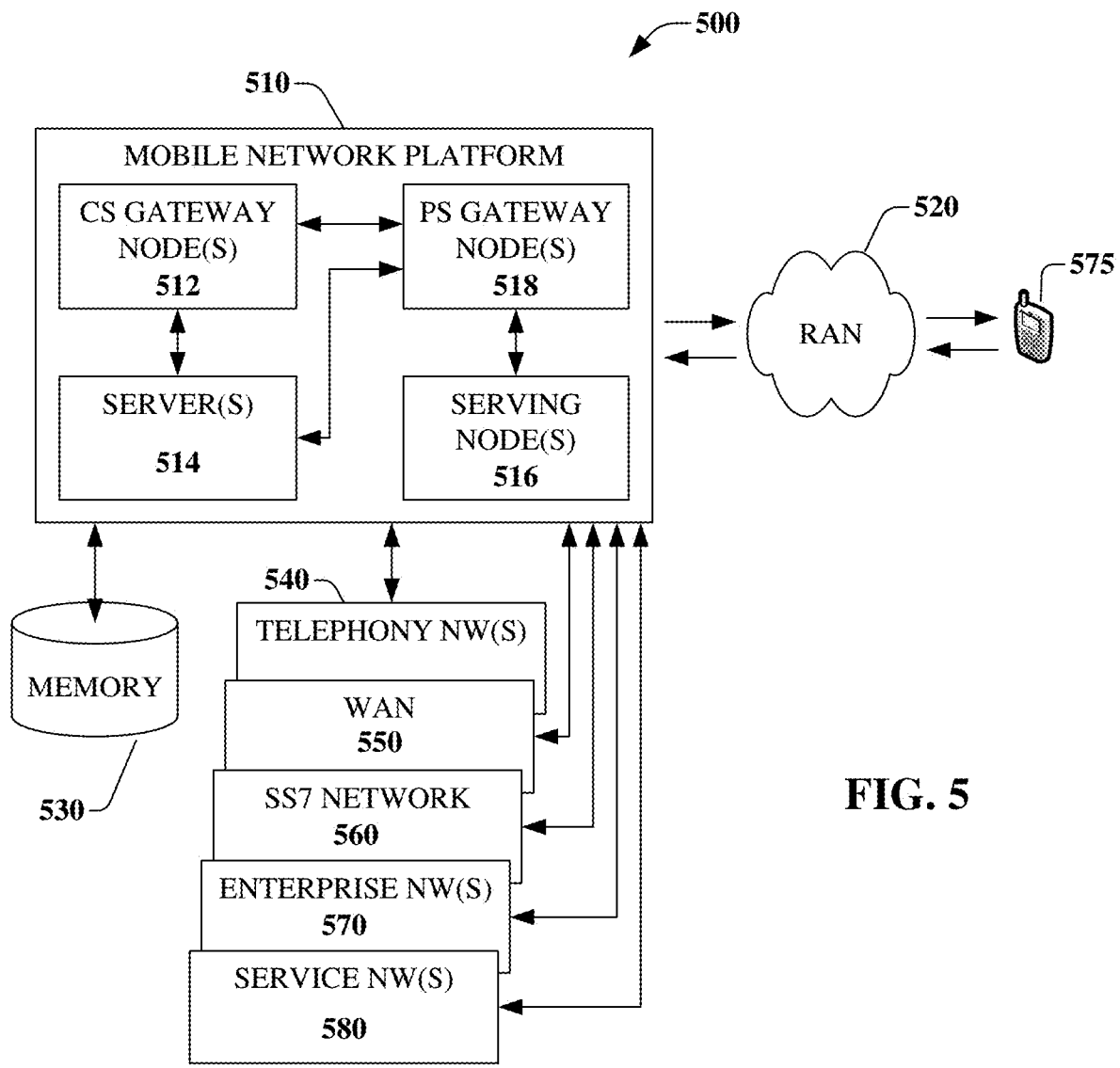
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, the binaural rendering system 220, a processing system that performs the method 230, and/or VNEs 330, 332, 334, etc. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
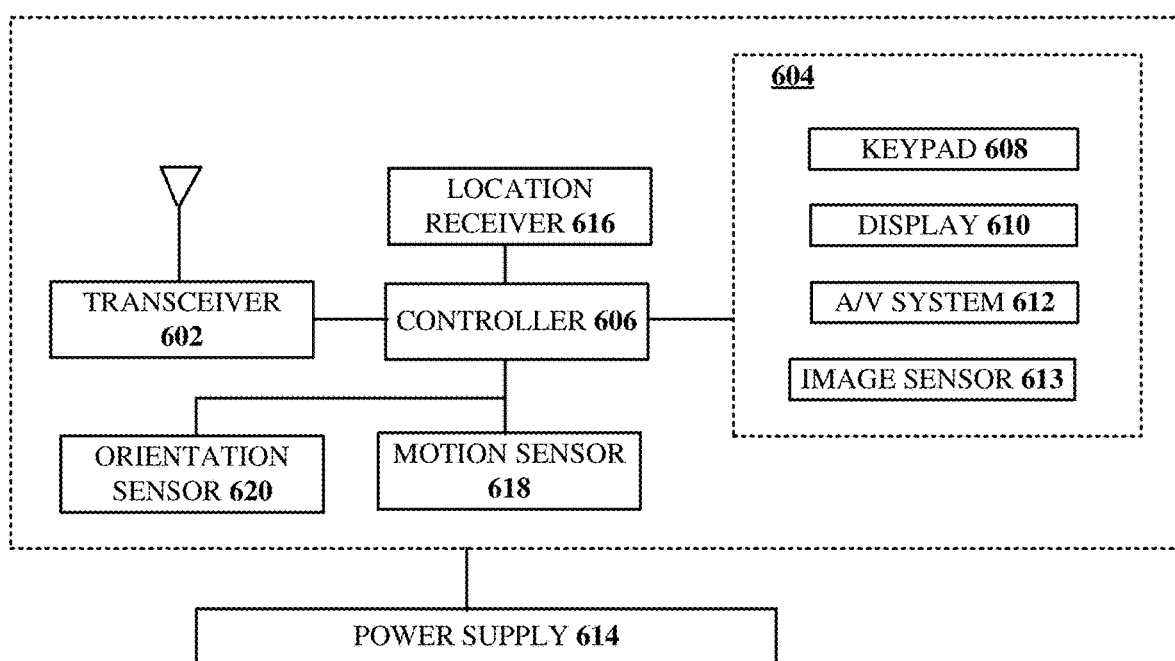
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125, or the binaural rendering system 220, a processing system that performs the method 230.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method for spherical video streaming over a network, the method comprising:
   downloading, by a processing system including a processor, audio data for rendering the spherical video streaming;
   determining, by the processing system, whether there is a single source or a plurality of sources of audio in the audio data;
   responsive to a determination that there is only the single source of the audio in the audio data, prefetching, by the processing system, video data in a field of view centered on spatial coordinates of the single source of audio;
   responsive to a determination that there is the plurality of sources of the audio in the audio data, sorting, by the processing system, the plurality of sources of the audio according to an estimated sound source energy for each source in the plurality of sources, thereby creating a sorted list of the plurality of sources; and
   prefetching, by the processing system responsive to the determination that there is the plurality of sources of the audio in the audio data, in an order of the sorted list of the plurality of sources, video data in plural fields of view centered on spatial coordinates of each audio source in the sorted list of the plurality of sources, wherein the prefetching retrieves as many of the plural fields of view within an available bandwidth of the network.

2. The method of claim 1, further comprising: rendering, by the processing system, the audio data and the video data corresponding to a selected field of view, wherein the selected field of view is in the plural fields of view or the field of view centered on spatial coordinates of the single source of the audio.

3. The method of claim 1, further comprising sorting audio sources having approximately a same amount of energy based on their proximity to other sources in the sorted list of the plurality of sources.

4. The method of claim 3, wherein the audio data comprises an object-based representation that includes metadata that describes the spatial coordinates of each source of the audio.

5. The method of claim 4, wherein the audio data conforms to an International Telecommunication Union Radiocommunication sector Audio Definition Model.

6. The method of claim 1, further comprising analyzing, by the processing system, an audio sound field in the audio data to derive spatial coordinates of each sound source.

7. The method of claim 1, further comprising sorting audio sources having approximately a same amount of energy based on their proximity to a viewer, and limiting, by the processing system, the sorted list to 24 or fewer sources of the audio in the plurality of sources.

8. The method of claim 1, wherein the estimated sound source energy for each source of the audio is frequency-based.

9. The method of claim 8, wherein the estimated sound source energy for each source of the audio is based on sound pressure.

10. The method of claim 8, wherein the estimated sound source energy for each source of the audio is based on a particle velocity.

11. The method of claim 1, wherein the estimated sound source energy for each source of the audio is based on steered response power.

12. The method of claim 1, wherein the estimated sound source energy for each source of the audio is based on an intensity vector.

13. A device, comprising:
a processing system including a processor; and
a memory that stores executable instructions that, when executed by the processing system, facilitate performance of operations, the operations comprising:
downloading audio data associated with a spherical video streaming on a network;
identifying sources of audio in the audio data;
determining whether there is a single source or a plurality of sources of the audio in the audio data;
responsive to a determination that there is only the single source of the audio in the audio data, prefetching video data in a field of view centered on spatial coordinates of the single source of audio;
responsive to a determination that there is the plurality of sources of the audio in the audio data, sorting the plurality of sources of the audio according to criteria for each source in the plurality of sources, thereby creating a sorted list of the plurality of sources;
prefetching responsive to the determination that there is the plurality of sources of the audio in the audio data in an order of the sorted list of the plurality of sources, video data in plural fields of view centered on spatial coordinates of each audio source in the sorted list of the plurality of sources, wherein the prefetching of the video data is terminated after a certain number of fields of view; and
rendering the audio data and the video data corresponding to a selected field of view, wherein the selected field of view is in the plural fields of view or the field of view centered on spatial coordinates of the single source of the audio.

14. The device of claim 13, wherein identifying the sources of audio comprises steered response power.

15. The device of claim 13, wherein identifying the sources of audio comprises intensity vector.

16. The device of claim 13, wherein the criteria comprises relative sound source energy of each source of the audio.

17. The device of claim 13, wherein the certain number of fields of view comprises a lesser of 24 or as many FoVs as can be supported by an available bandwidth of the network.

18. A non-transitory, machine-readable medium, comprising executable instructions that, when executed by a processing system including a processor, facilitate performance of operations, the operations comprising:
prefetching audio data from a spherical video streaming over a network;
identifying sources of audio in the audio data;
determining whether there is a single source or a plurality of sources of the audio in the audio data;
responsive to a determination that there is the plurality of sources of the audio in the audio data, sorting the plurality of sources of the audio according to criteria for each source in the plurality of sources, thereby creating a sorted list of the plurality of sources;
prefetching video data responsive to the determination that there is the plurality of sources of the audio in the audio data, in an order of the sorted list of the plurality of sources in plural fields of view centered on spatial coordinates of each audio source in the sorted list of the plurality of sources wherein the prefetching of the video data is terminated after a certain number of fields of view; and
rendering the audio data and the video data corresponding to a selected field of view, wherein the selected field of view is in the plural fields of view.

19. The non-transitory, machine-readable medium of claim 18, wherein the operations further comprise analyzing an audio sound field in the audio data to derive spatial coordinates of each source of the audio.

20. The non-transitory, machine-readable medium of claim 19, wherein the analyzing further comprises a frequency-based computation of a time difference of arrival, a sound pressure, a particle velocity, or a combination thereof.

* * * * *